(12) United States Patent
Stoiber et al.

(10) Patent No.: US 8,602,763 B2
(45) Date of Patent: Dec. 10, 2013

(54) APPARATUS FOR HEATING PREFORMS

(75) Inventors: Christian Stoiber, Michelsneukirchen (DE); Wolfgang Schönberger, Pettendorf (DE)

(73) Assignee: Krones AG, Neutraubling (DE)

( * ) Notice: Subject to any disclaimer, the term of this patent is extended or adjusted under 35 U.S.C. 154(b) by 196 days.

(21) Appl. No.: 12/643,177

(22) Filed: Dec. 21, 2009

(65) Prior Publication Data

US 2010/0096782 A1 Apr. 22, 2010

Related U.S. Application Data

(63) Continuation of application No. PCT/EP2008/005380, filed on Jul. 2, 2008.

(30) Foreign Application Priority Data

Jul. 4, 2007 (DE) .......................... 10 2007 031 210

(51) Int. Cl.
*B29C 49/68* (2006.01)

(52) U.S. Cl.
USPC ........ 425/174.4; 425/173; 425/174; 425/182; 425/384; 425/526; 264/535

(58) Field of Classification Search
USPC .............. 425/173, 174, 174.4, 182, 384, 526; 264/535
See application file for complete search history.

(56) References Cited

U.S. PATENT DOCUMENTS

| | | | | |
|---|---|---|---|---|
| 5,511,145 A * | 4/1996 | Bailey et al. | ................... | 392/355 |
| 5,823,317 A * | 10/1998 | Bankuty et al. | ............... | 198/395 |
| 5,834,038 A * | 11/1998 | Ogihara | ......................... | 425/182 |
| 5,980,229 A * | 11/1999 | Collombin | ................. | 425/174.4 |
| 6,361,301 B1 * | 3/2002 | Scaglotti et al. | ........... | 425/174.4 |
| 7,553,156 B2 | 6/2009 | Doudement | | |
| 2007/0148272 A1 * | 6/2007 | Doudement | ............... | 425/174.4 |
| 2008/0073333 A1 * | 3/2008 | Doudement | ................... | 219/385 |

FOREIGN PATENT DOCUMENTS

| | | |
|---|---|---|
| CN | 1898074 A | 1/2007 |
| DE | 202005020252 U1 | 2/2007 |
| FR | 2863932 A1 | 6/2005 |
| FR | 2872734 A1 * | 1/2006 |
| GB | 2156732 A | 10/1985 |
| WO | 01/049075 | 7/2001 |
| WO | 01/062463 | 8/2001 |

OTHER PUBLICATIONS

International Search Report, mailed Oct. 8, 2008, from International Application No. PCT/EP2008/005380 filed Jul. 2, 2008.

* cited by examiner

*Primary Examiner* — Timothy Kennedy
(74) *Attorney, Agent, or Firm* — Patentbar International, P.C.

(57) ABSTRACT

The invention relates to a device for heating of preforms formed of plastic with infrared radiation, whereby the preform is struck by cooling air at its neck finish and on its body. Furthermore, the infrared radiators are struck by cooling air at their ends. The invention relates to a heating device in which the three cooling air streams may be controlled or regulated independently from each other.

13 Claims, 6 Drawing Sheets

APPARATUS FOR HEATING PREFORMS

RELATED APPLICATIONS

This application is a Continuation of International Application No. PCT/EP2008/005380 filed Jul. 2, 2008, which claims priority to German Patent Application No. DE 10 2007 031 210.7 filed Jul. 4, 2007, both of which are incorporated herein by reference in their entirety.

FIELD OF THE INVENTION

The invention relates to a device for heating plastic preforms.

BACKGROUND OF THE INVENTION

Such preforms are used in the manufacture of plastic objects in which these objects are manufactured by the molding of preforms. For this purpose, it is necessary to heat the preforms. For example, such devices and methods are used in the manufacture of plastic bottles, which are manufactured by inflating previously heated preforms.

Such devices used for the manufacture of hollow parts such as beverage bottles are sufficiently known from prior art. Thus, for example, WO 0149075 A1 discloses an infrared oven for heating plastic preforms which will later be molded into bottles. In the process, preforms are passed by infrared radiators, and are heated by them. Because very many plastics (e.g., PET) have the property that the external surface gets hot more quickly than the internal surface, it is necessary to ensure temperature equalization during the heating process. As a result, it is necessary to expose the preform to cooling air during the heating process so that the external surface of the preform does not get too hot during the heating process, which would cause crystallization at the surface, rendering the preform unusable. It is further necessary to cool the neck finish of the preform because it must be heated only very little in order later to achieve correct seating of the closure on the neck finish.

WO 0149075 A1 thus discloses a fan through which cooling air is conveyed in the direction of the preform and the infrared lamps. Furthermore, the same cooling air is used to cool the area of the neck finish of the preform.

This device has the disadvantage that cooling of the area of neck finish of the preform cannot be precisely adjusted because it is dependent on the adjusted volumetric flow rate or mass flow rate of the cooling air for the body area of the preform. Because cooling of the surface of the body area of the preform takes priority, adjustment of the volumetric flow rate of the cooling air conforms to the optimal parameters for cooling the body. It may therefore occur that the neck finish is cooled too little, which would lead to unusability of the preform, or that the area of neck finish is cooled too much, which would lead to excessive use of air by the device, which constitutes uneconomical operation of the system.

SUMMARY OF THE INVENTION

It is therefore the object of the present invention to provide a device and a method, respectively, in which cooling of the preform in the heating device or cooling of the infrared radiators of the device may be optimally adjusted in order to enable efficient operation.

The object with regard to the device is solved by the claimed features; the object with regard to the method by the claimed features.

The device preferably relates to an oven for heating of preforms formed of plastic, whereby these preforms are preferably implemented in PET to be molded into bottles. The later molding into bottles preferably occurs by means of a stretch blow molding process. In order to heat the preforms, these are passed by heaters, whereby the heaters have a plurality of infrared radiators, which are preferably arranged with regard to their longitudinal axis perpendicular to the longitudinal axis of the preforms, and whereby a plurality of infrared radiators are arranged in a stacked arrangement in the direction of the longitudinal axis of the preforms. This arrangement has the advantage that a heat profile may be applied over the length of the preform. The preforms are preferably conveyed past the heaters equidistantly at a uniform rate of speed. Transport of the preforms is preferably undertaken such that they are applied to mounting mandrels which, in turn, are attached to chain links, whereby a plurality of chain links form a chain which runs through the device in an endless circle. It is, however, conceivable that the preforms may be transported through the device by means of a clamp on their necks. However, transport by means of mounting mandrels is preferable, whereby the area of the preform that is not to be heated is located above a cooling shield. The device preferably has three air ducts that are separated from each other, whereby the first air duct is arranged such that the air is blown in the area of neck finish of the preform in the direction of the infrared radiators of the heater. The second air duct is preferably arranged such that the cooling air passes over the surface of the body of the preform, whereby the second air duct is arranged such that the cooling air arrives at the area of the heater after cooling the surface of the preform. A third cooling air duct is preferably arranged such that the ends of the infrared radiators, which may become very hot as a result of their high watt consumption are cooled. To this end, the air duct is preferably applied such that only the ends of the infrared radiators are cooled but not, however, the active radiating area of the radiator.

The device has an inlet and outlet, whereby the inlet and the outlet are preferably mounted adjacent to each other, which means that the path taken by the preforms through the device preferably describes an approximately U-shaped configuration, whereby heaters are located at least in part in the straight segments of the transport path in the device. The outlet of the device is connected with a downstream machine, e.g., a stretch blow molding machine for the manufacture of bottles.

The device is preferably arranged such that at least the first and the second air duct are attached within the two arms of the U-shaped transport path, and the air outlets blow the cooling air in the direction of one of the arms of the transport path. The described arms of the U-shaped transport path are henceforth referred to as transport lines. Both transport lines are connected by means of a direction change.

The heater preferably has an open space that is connected with a flue, through which the cooling air from air outlet 11, air outlet 12, and air outlet 13 may be evacuated. According to one of the preferred developments of the invention, a minimum of one cooling air stream is accelerated to such an extent that it still has sufficient energy on arriving in the area of the flue that it entrains both of the other air streams.

The heaters are preferably arranged in a heater carrier, which may be deviated into at least two positions (one operational position and one maintenance position). The heater carrier may be deviated approximately in the direction of the cooling air stream of the first and second air outlet.

The device for heating of preforms is preferably modular such that it is comprised of a total of three different modules (segments). The first segment comprises the inlet and outlet of the device; the second segment comprises a middle part of the device; the third segment comprises the end part of the device, which comprises a direction change. A device for heating of preforms is therefore formed of at least three segments, namely a beginning segment with inlet and outlet, the middle segment, and the end segment. This construction enables the unproblematic provision of any configuration of the device for heating of preforms because any number of middle segments may be inserted between the beginning segment and the end segment. According to a preferred development of the invention, each segment has a first, a second, and a third air duct, a first, a second, and a third air outlet, as well as at least one heater, preferably, however, two heaters.

The method for heating of preforms according to the invention is preferably characterized in that the three cooling air streams from the three air ducts may be controlled and regulated individually. It is also possible to control and/or regulate each individual cooling process, that is cooling of the body, of the neck finish, and of the ends of the infrared radiators. The optimal parameters (e.g., temperatures) may thus be adjusted for operation of the system. The cooling air streams are preferably directed to a common flue after cooling each particular area, from where they are transported away and preferably evacuated from the machine. According to a preferred development of the invention the cooling air streams from the first air duct and the second air duct are arranged approximately perpendicular to the first and the second transport line.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
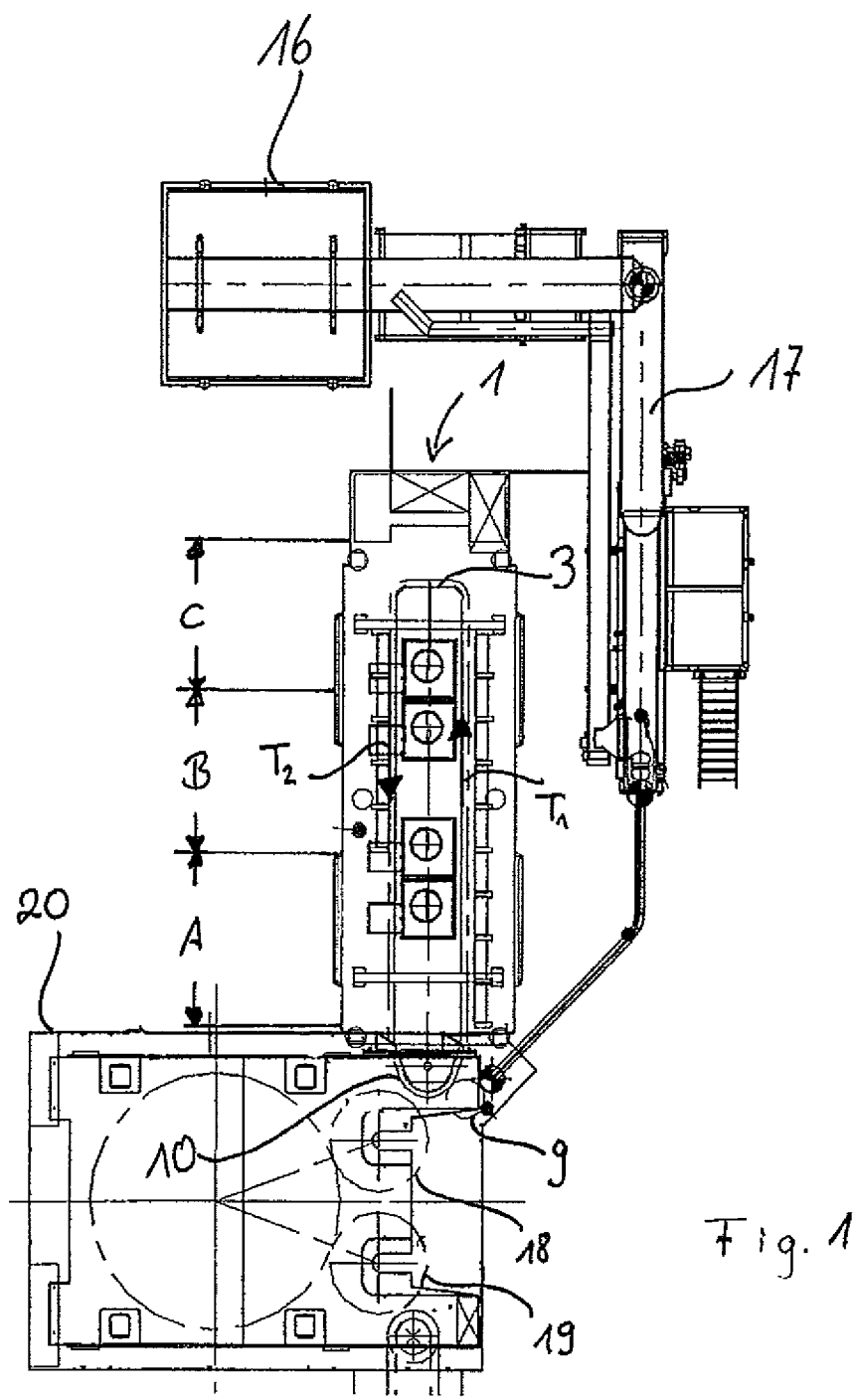
FIG. 1 shows a top view of a system for manufacturing of hollow plastic parts.

FIG. 1 shows a device for manufacturing hollow plastic parts out of heated preforms 2, whereby the preforms 2 are stored in a multiplicity in a storage unit 16 and are fed into a device 1 for heating of preforms 2 via a preform roller orienter 17 and an inlet 9. In the device 1, the preforms 2 are transported in an approximately U-shaped heating segment until the outlet 10, where they are transferred to the blower 20 with an inlet star wheel 18. After the heated preforms are inflated to form a receptacle by means of compressed air, they are transferred from the blower 20 with an outlet star wheel 19, and from there to a downstream machine, e.g., an air conveyor, a labeling machine, or a filler.

The device 1 is modularly constructed, which means that there are various functional units which may be connected to each other in any sequence. Thus, the device 1 is, for example, separable into three different segments A, B, C, whereby segment A represents the front part of the system, which also comprises the inlet 9 and outlet 10. Part C forms the end piece of the device 1 with a direction change 3 which connects the two straight transport lines T1 and T2 with each other, while part B forms the middle piece of the device 1. The device 1 thus always comprises a segment A, a segment C, and at least one segment B, whereby an almost arbitrary number of segments may be inserted between A and C here. This modular construction has the advantage that an optimal size of the device 1 for heating may be provided for any given preformance class of blowers 20.

Figure 2:
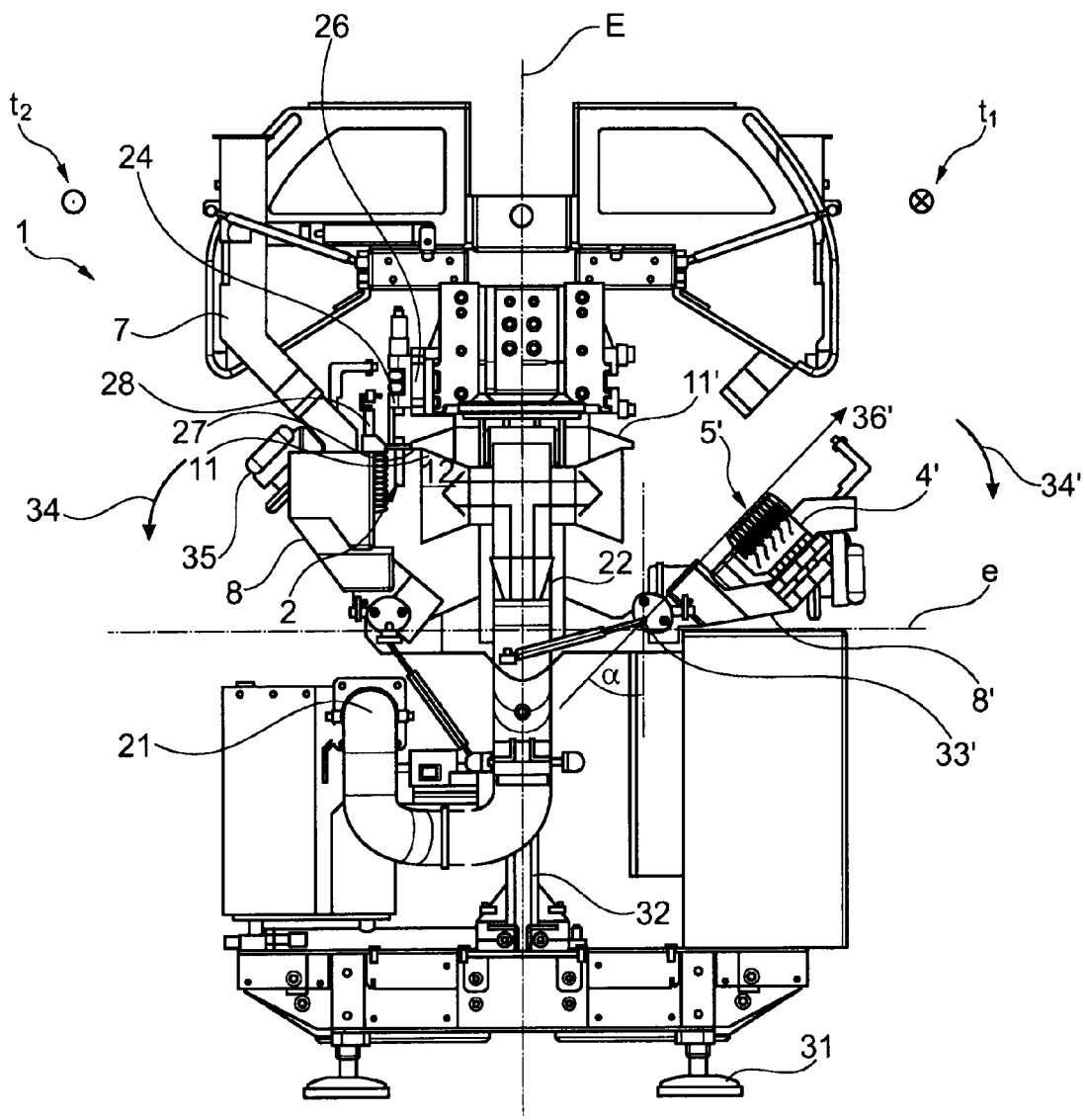
FIG. 2 shows a cross-section of a device for heating of preforms.

FIG. 2 shows a cross-section of the device 1 for heating of preforms 2. The device 1 is supported by feet 31 in relation to an installation site. A central supporting frame 32 is provided to support the important components for heating, and for precise adjustment. The device 1 is located in the upper part above the separation plane e, which comprises the relevant components for heating such as heaters and air outlets (11, 12, 13) and is symmetrically structured in relation to separation plane E. Transport line T1 is located on the right side, which has a transport device t1; transport line T2, which has a transport device t2, is located on the left side. For the sake of clarity, certain details are only represented on one side of the separation plane E; the description, however, relates to both sides. For the purpose of identification, the components on the left side are identified with normal numbers "X"; for components on the right side, numbers "X'" are used. A chain link 26 is visible on which a mounting mandrel 24 to which a cooling shield 27 for preforms 2 is attached. The basic structure of the air duct in device 1 is implemented such that the air supply sites for the air ducts 21, 22, and 23 lie below or in the vicinity of the horizontal separation plane e. Conveyance of the cooling air to the air outlets 11, 12, and 13 occurs in the area of the vertical separation plane E or of the supporting frame 32 largely perpendicularly in an upward direction. Air ducts 21, 22, 23 each have a pipe with powered fans, which are not shown in the figures, for producing an air stream. Furthermore, air filters, which are also not shown, are located in front of each of the fans. The first air duct 21 draws air to cool the threaded neck finish; the second air duct 22 draws air to cool the body of the preform 2; and the third air duct 23 draws air to cool the radiator ends. Each air duct 21, 22, and 23 has an air outlet 11, 12, and 13 at the cooling air outlet side. The air outlet 11 for cooling the threaded neck finish of the preform 2 has a funnel shape and becomes increasingly tapered in the direction of the air outlet. This enables very precise positioning of the air stream in the area of the threaded neck finish. This tapering also enables the generation of a relatively strong stream as a result of a high volumetric flow rate, which is also used to remove the cooling air to cool the body and the radiator. The cooling air is deflected such that at the air outlet 11 it is forced perpendicular to the direction of transport t1 above the cooling shield 27 against the area of the neck finish of the preform 2. After the area of the neck finish of the preform 2 in the direction of the flow, the cooling air continues to circulate around the radiator cover 28 for the neck finish, which prevents heating of the upper machine parts such as the chain links 26. In the direction of flow after circulating around the radiator cover 28, the cooling air is forced into the flue 7. The flue 7 is mounted inside the machine cover of the device 1 and conveys the collected cooling air, which has in the meantime become heated, upward into the environment.

The air outlet 12 for cooling the body is mounted directly below the air outlet 11. The air outlet 12 becomes wider in the direction of flow and is also mounted such that the cooling air is largely forced perpendicular to the transport direction t1 against the preform 2. Because of the increase in diameter of the air outlet 12, a considerably lower flow velocity of cooling air is achieved here than is the case with the cooling air for the cooling of the neck finish of the preform. The air outlet 12 is provided at its end with reflectors 25 in the direction of flow, which reflect the radiation emitted by the infrared radiators 5 in the direction of the preform 2. The reflectors 25 are implemented as tiles between which a space is formed through which the cooling air may pass.

In the direction of flow after circulating around the body of the preform 2, some air that has in the meantime become somewhat heated strikes the radiant heater and then the downstream reflectors 25 which are mounted after the radiant heaters, and which are preferably also implemented as reflector tiles. The cooling air is deflected perpendicularly downward at the reflectors and redeflected at the lower end of the heater 4 into its original direction of flow into the heater 4. Having arrived there, it is entrained through the open space 6 by the suction generated by the cooling air for the threaded neck finish and evacuated via the flue 7 into the environment.

The heater 4 is mounted with its infrared radiators 5 in a heater carrier 8. The heater carrier 8 may be deviated around an axis 33 toward the outside in the direction of the arrow 34. This deviation enables good access to the device 1 by operating personnel so that, for example, they may check whether radiators have failed. Furthermore, the heaters 4 can easily be replaced. The heater 4 need merely be released and removed by its handles 35 in the direction of the arrow 36.

Figure 3:
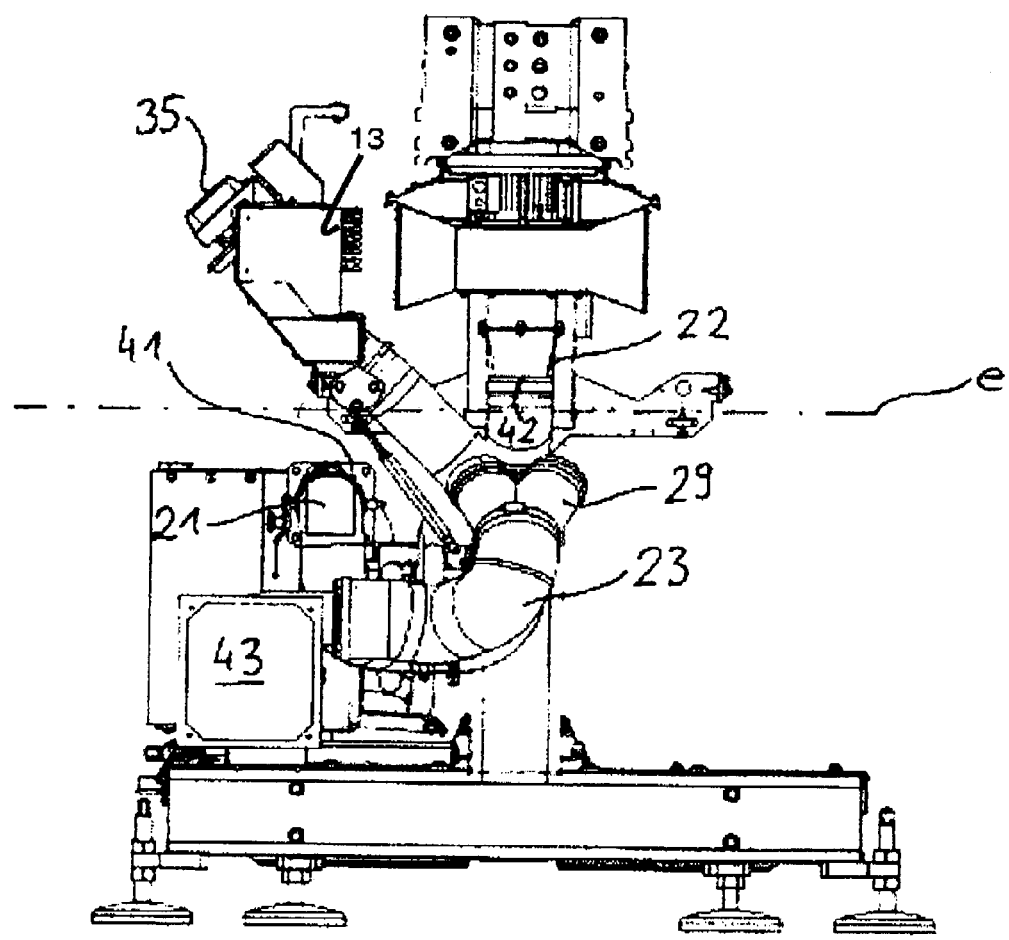
FIG. 3 shows a detail view of the air supplies in the lower area of the device.

FIG. 3 shows a detailed view of the device according to FIG. 2 with regard to the air duct. The third air duct 23 with its third air induction site 43 is visible here as well. The air is conveyed from the air induction site 43 via the pipe to a Y-pipe 29, where the cooling air stream is divided between the left and the right halves of the device 1. The cooling air is here deflected diagonally upward, and it is then deflected in the direction of the heater 4 and from there in the direction of the radiator end holder 37.

Figure 4:
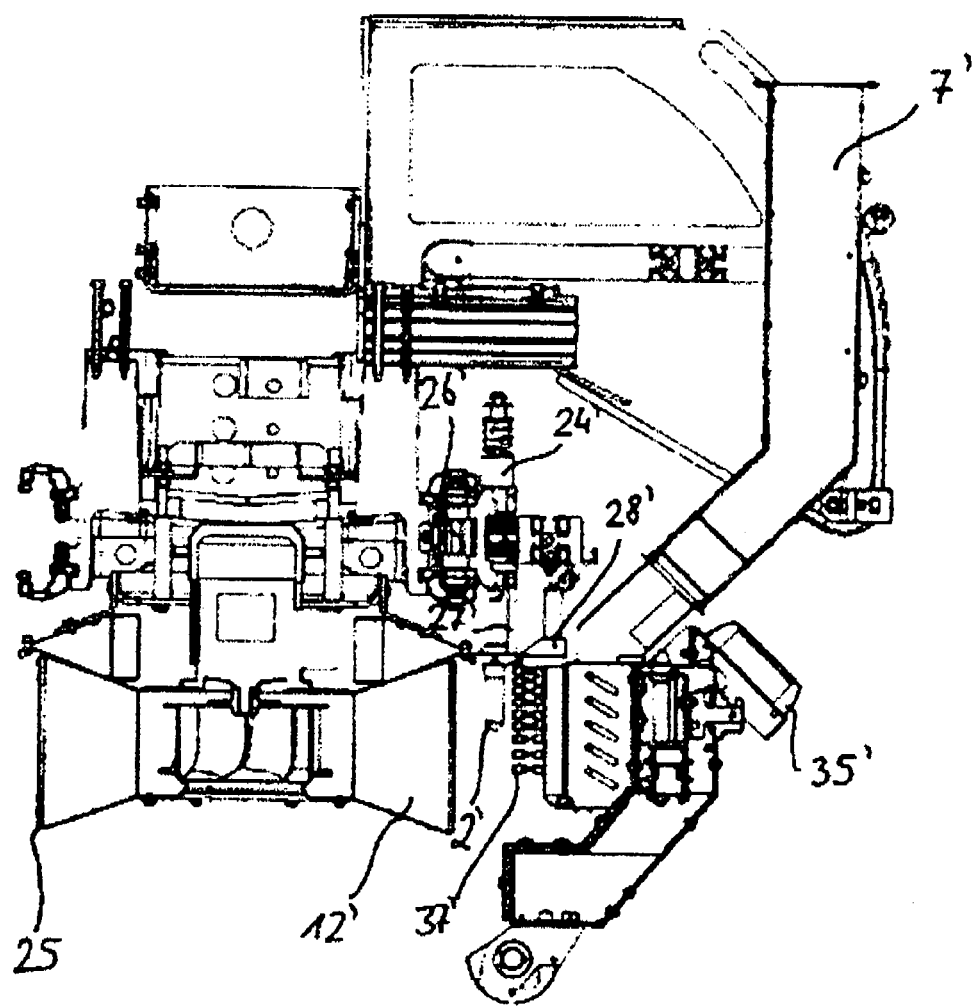
FIG. 4 shows a detail view of the cross-section through the device according to FIG. 2.

FIG. 4 shows a detail view of the upper half of the device 1. Here, the first air duct 21 is visible with the first induction site 41, whereby the air is accelerated by the fan and forced in the direction of the second air outlet 12, 12'.

Figure 5:
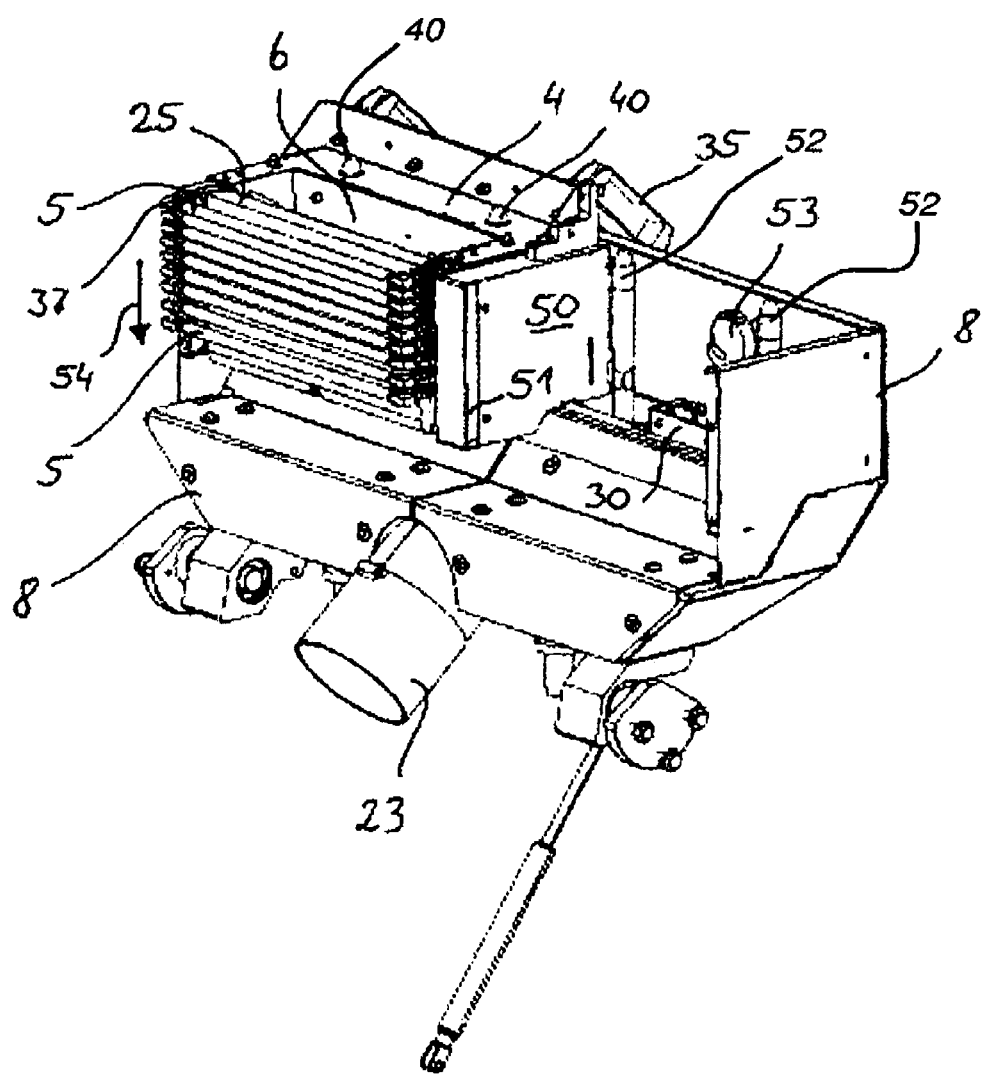
FIG. 5 shows an isometric view of a heater of a device for heating of preforms.

FIG. 5 shows two heater carriers 8, whereby a heater 4 is located in the left heater carrier 8. The heater 4 has an infrared radiator 5, radiator end holder 37, a reflector 25, an open space 6, handles 35, an electric plug (not shown), as well as two mandrel receivers 40. There is further a third air duct 23 in the vicinity of the heater carrier 8 from where the air is conveyed into the cooling ashlar 50. On both of its lateral surfaces, the cooling ashlar 50 has an air outlet band 51 which forces the cooling air precisely against the radiator end holder 37. The cooling ashlar 50 is always located to the left and to the right at the end of a heater carrier 8. After cooling of the radiator end holder 37, the cooling air—exactly as with the cooling air in body cooling—is forced downward along the reflector 25 in the direction of the arrow 54, where it then flows via the guide bevel into the open space 6 and from there into the flue 7.

The heater carrier 8 has an electric contact connection 30, which interacts with the electric plug of the heater 4. Furthermore, the heater carrier 8 has two mandrels 52 which interact with the mandrel receivers 40 of the heater 4. If the heater 4 is in the heater carrier 8, an operative connection and locking is established by activating a catch mechanism 53. The catch mechanism 53 is activated from outside by means of a lever 56. For this purpose, a heater 4 is taken by its handles 35 and placed such that the mandrels 52 enter the mandrel receivers 40. The heater is then lowered, whereby it catches before the end position because a cam hears against the catch mechanism 53. The catch mechanism 53 has a spiral which by rotating (activation of the lever 56) forces the cam downward, thereby introducing and securing the electrical plug into the electrical contact connection 30.

Figure 6:
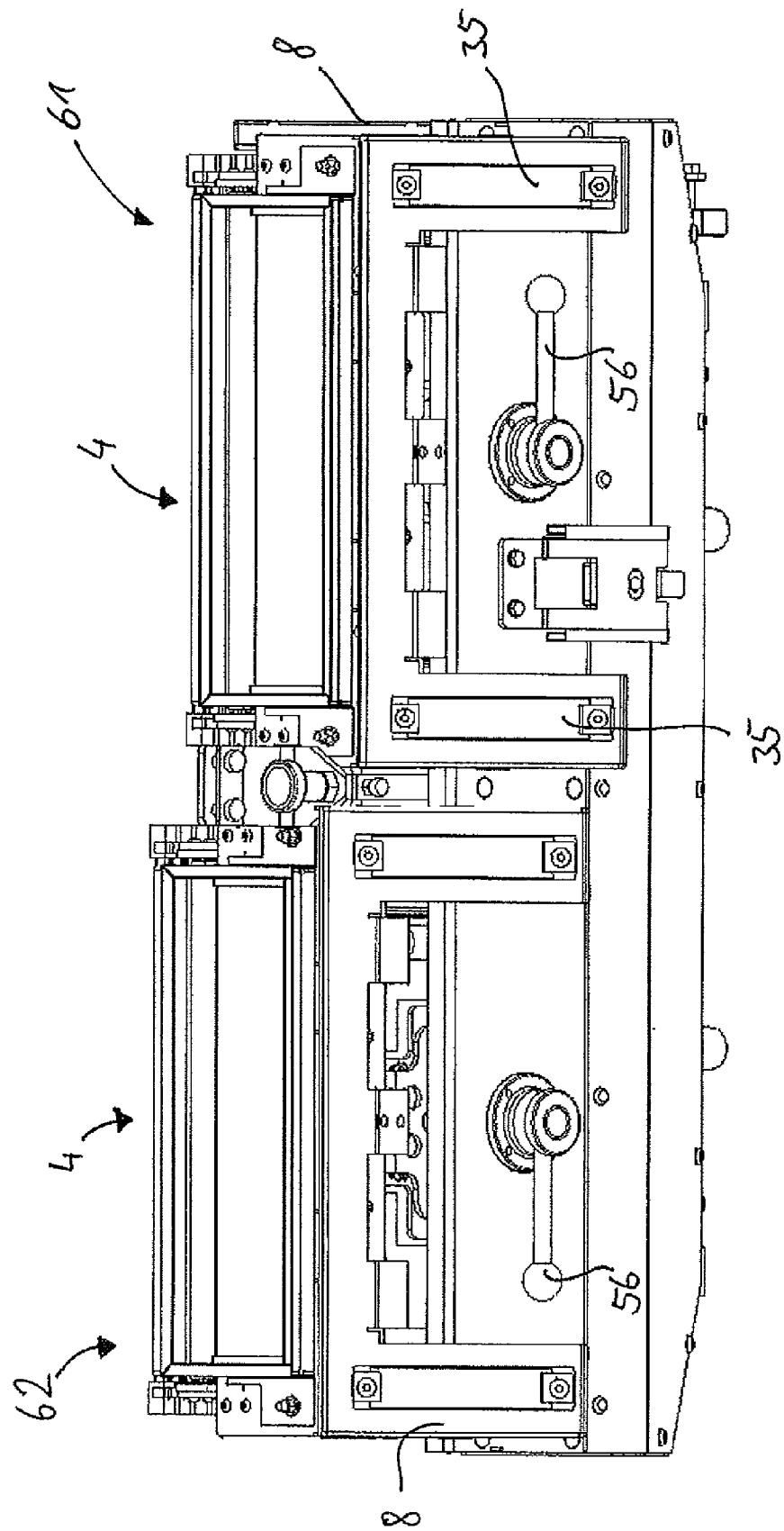
FIG. 6 shows a top view of a heater according to FIG. 4.

FIG. 6 shows two positions of the heater 4, namely in an engaged position 61 and in a free position 62. In the engaged position, the lever 56 is forced to the right, which activates the catch mechanism 53, whereas the lever is to the left in the free position 62. The free position 62 is also recognizable in that the left heater 4 projects further out of the heater carrier 8 than does the right heater 4.

While this invention has been particularly shown and described with references to preferred embodiments thereof, it will be understood by those skilled in the art that various changes in form and details may be made therein without departing from the scope of the invention encompassed by the appended claims.

What is claimed is:

1. A device for heating of preforms formed of plastic with a neck finish and a body by means of infrared radiation,
    whereby the preforms are conveyed through the device at a uniform speed past heaters, which hold a plurality of infrared radiators in radiator end holders,
    whereby a minimum of three separate air ducts are present, wherein
        the first air duct is provided to cool the neck finish of the perform during heating,
        the second air duct to cool the body of the perform during heating, and
        the third air duct to cool the ends of the infrared radiators during heating,
    wherein the air from the third air duct is directed precisely towards the radiator end holders,
    wherein a stream of air in each of the separate air ducts is separately controllable,
    wherein a flue is provided through which a cooling air stream from the first air duct, a cooling air stream from the second air duct, and a cooling air stream from the third air duct are evacuated, and
    wherein at least one of the cooling air streams is accelerated to such an extent that it has sufficient energy upon arriving in the area of the flue so that the at least one of the cooling air streams entrains the other cooling air streams.

2. The device according to claim 1, wherein it has an inlet and outlet, whereby the inlet is connected with a preform roller orienter and the outlet with a blower.

3. The device according to claim 1, wherein the preforms are largely transportable linearly through the device.

4. The device according to claim 2, wherein it has at least one direction change which the preforms pass through at least once between the inlet and the outlet.

5. The device according to claim 4, wherein two transport lines are present, whereby the first transport line extends from the inlet of the device to the direction change, and the second transport line from the direction change to the outlet of the device.

6. The device according to claim 5, wherein the second air duct has at least one second air outlet between the first transport line and the second transport line through which the cooling air is conveyed in the direction of the body segments of the preforms.

7. The device according to claim 5, wherein the first air duct has at least one first air outlet between the first transport line and the second transport line through which the cooling air is conveyed in the direction of the neck finish of the preforms.

8. The device according to claim 1, wherein the third air duct has a third air outlet through which the cooling air is conveyed in the direction of the ends of the infrared radiators.

9. The device according to claim 1, wherein the heater has an open space through which the cooling air may be evacuated, the open space being connected with the flue.

10. The device according to claim 1,
wherein it is divisible into at least three segments,
whereby
the first segment comprises an inlet and an outlet of the device,
at least one second segment a middle part of the device, and
the third segment comprises a direction change.

11. The device according to claim 10, wherein each segment comprises a first air duct, a second air duct, and a third air duct, a first air outlet, a second air outlet, and a third air outlet as well as at least one heater.

12. The device according to claim 1, wherein the heaters have at least one operational position as well as one maintenance position, whereby the maintenance position is deviated around a pivoting angle to the more closely adjacent outside of the device.

13. The device according to claim 1, wherein reflectors are located before the preforms and after the infrared radiators in the direction of flow of the first and second cooling air stream.

* * * * *